United States Patent
Ishii

(10) Patent No.: US 12,092,551 B2
(45) Date of Patent: Sep. 17, 2024

(54) STRUCTURE DEFLECTION MEASUREMENT APPARATUS

(71) Applicant: NEC Corporation, Tokyo (JP)

(72) Inventor: Asuka Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 17/435,767

(22) PCT Filed: Mar. 8, 2019

(86) PCT No.: PCT/JP2019/009520
§ 371 (c)(1),
(2) Date: Sep. 2, 2021

(87) PCT Pub. No.: WO2020/183549
PCT Pub. Date: Sep. 17, 2020

(65) Prior Publication Data
US 2022/0050009 A1    Feb. 17, 2022

(51) Int. Cl.
*G01M 5/00* (2006.01)
*E01D 19/12* (2006.01)
(Continued)

(52) U.S. Cl.
CPC ........ *G01M 5/0008* (2013.01); *G01M 5/0041* (2013.01); *G06T 7/0002* (2013.01);
(Continued)

(58) Field of Classification Search
CPC . G01M 5/0008; G01M 5/0041; G06T 7/0002; G06T 7/70; G06T 2207/30184;
(Continued)

(56) References Cited

U.S. PATENT DOCUMENTS

2020/0011762 A1*  1/2020  Reitsema ............ G01M 5/0041

FOREIGN PATENT DOCUMENTS

| JP | 2000-055776 A | 2/2000 |
|---|---|---|
| JP | 2004-252520 A | 9/2004 |

(Continued)

OTHER PUBLICATIONS

Contactless Bridge Weigh-in-Motion, Ojio et al., 2016; https://researchrepository.ucd.ie/server/api/core/bitstreams/58d97bba-38be-4eb3-a2d3-0be2484e87ed/content (Year: 2016).*

(Continued)

*Primary Examiner* — Jianxun Yang

(57) ABSTRACT

An apparatus includes: a deflection acquiring unit that acquires a deflection amount caused in a measurement target region on a structure by a vehicle traveling on the structure; a vehicle position acquiring unit that acquires a position of the vehicle on the structure at time when the deflection amount is acquired; and a rigidity coefficient calculating unit that calculates a rigidity coefficient specifying a relation between a magnitude of a force applied to the structure due to a weight of the vehicle and flexural rigidity of the structure, from a relation equation, the acquired deflection amount, and the detected position of the vehicle. The relation equation is established among a position of the vehicle on the structure, the magnitude of the force, a position of the measurement target region on the structure, a length of the structure, the flexural rigidity, and a deflection amount caused in the measurement target region.

9 Claims, 9 Drawing Sheets

(51) Int. Cl.
   *G06T 7/00* (2017.01)
   *G06T 7/70* (2017.01)
   *G06V 10/22* (2022.01)

(52) U.S. Cl.
   CPC ............... *G06T 7/70* (2017.01); *G06V 10/22* (2022.01); *E01D 19/125* (2013.01); *G06T 2207/30184* (2013.01); *G06T 2207/30236* (2013.01)

(58) Field of Classification Search
   CPC .......... G06T 2207/30236; G06V 10/22; E01D 19/125; E01D 22/00
   See application file for complete search history.

(56) References Cited

FOREIGN PATENT DOCUMENTS

| JP | 2010-197249 A | 9/2010 |
|---|---|---|
| JP | 2016-084579 A | 5/2016 |
| JP | 2017-058177 A | 3/2017 |
| JP | 2017-142185 A | 8/2017 |
| WO | 2017/200380 A1 | 11/2017 |
| WO | 2018/138943 A1 | 8/2018 |

OTHER PUBLICATIONS

International Search Report for PCT Application No. PCT/JP2019/009520, mailed on Jun. 4, 2019.
Kisu, Hiroyuki et al., "A Study for Identification of Bending Rigidity of a Beam", Transactions of the Japan Society of Mechanical Engineers Series A, vol. 70, No. 698, Oct. 25, 2004, pp. 1462-1467.
Japanese Office Communication for JP Application No. 2021-504629, mailed on Oct. 4, 2022 with English Translation.
Japanese Office Action for JP Application No. 2021-504629 mailed on Apr. 13, 2022 with English Translation.
Development of Technology to Measure the Deflection of a Bridge just by Taking a Picture with a Digital Camera, National Institute of Advanced Industrial Science and Technology, [Online], Aug. 31, 2016, Internet< URL : https://www.aist.go.jp/aist_j/press_release/pr2016/pr20160831/pr20160831.html >, [Reiwa 4(Mar. 30, 2022) Search].
Commercialization of High-Precision Cameras for Monitoring of Large Infrastructure Structures such as Bridges, Kyowa Electronic Instruments Co., Ltd. [Online], Sep. 6, 2018, Internet <URL:https://prtimes.jp/main/html/rd/p/000000006.000024048.html>, [Reiwa 4(Mar. 30, 2022) Search].

* cited by examiner

FIG. 5

$$\delta = \begin{cases} K\dfrac{L-x_w}{L}x(-x^2-x_w^2+2Lx_w) & (0 \leq x \leq x_w) \\ K\dfrac{L-x}{L}x_w(-x_w^2-x^2+2Lx) & (x_w \leq x \leq L) \end{cases} \quad \cdots (1)$$

$$K = \dfrac{f}{6EI} \quad \cdots (2)$$

$$f = Mg \quad \cdots (3)$$

STRUCTURE DEFLECTION MEASUREMENT APPARATUS

This application is a National Stage Entry of PCT/JP2019/009520 filed on Mar. 8, 2019, the contents of all of which are incorporated herein by reference, in their entirety.

TECHNICAL FIELD

The present invention relates to a structure deflection measurement apparatus, a structure deflection measurement method, and a recording medium.

BACKGROUND ART

When a vehicle passes a structure such as a bridge, a load is applied to the structure and the structure is displaced. Various techniques for measuring such structure displacement have been proposed.

For example, Patent Document 1 describes a technique for measuring the deflection amount of a bridge when a given vehicle passes the bridge by using images captured by a video camera and a digital camera. To be specific, a characteristic of a vehicle traveling on a bridge is identified from a moving image captured by a video camera capturing the bridge, and a timing at which a given vehicle is passing the bridge is detected. Then, an image of the bridge is captured by a digital camera at the detected timing, and the distribution of the deflection amounts of the bridge is detected based on the captured image. Moreover, in Patent Document 1, detection of an overloaded vehicle and evaluation of the soundness of a bridge are performed based on the distribution of the measured deflection amounts.

Further, Patent Document 2 describes a technique of detecting timings at which a vehicle passes through both the ends of a bridge by acceleration sensors, detecting a deflection amount at the center portion of the bridge when the vehicle is on the bridge, and measuring the weight of the vehicle by Weigh-in-Motion based on the results of the above detections.

Patent Document 1: Japanese Unexamined Patent Application Publication No. 2016-084579
Patent Document 2: Japanese Unexamined Patent Application Publication No. 2017-058177

Flexural rigidity is one of the performance indexes of a structure such as a bridge. Since the flexural rigidity of a structure is constant in the short term, the use of the value thereof enables calculation of the weight of a vehicle traveling on the structure. On the other hand, since the flexural rigidity of a structure decreases due to aged deterioration of a floor deck and so on composing the structure in the long term, the use of the value thereof enables deterioration diagnosis of the structure. However, realization of the use as mentioned above requires to find the relation between a force applied to a structure by a vehicle weight and the flexural rigidity of the structure. According to the techniques described in Patent Documents 1 and 2 above, the relation between a force applied to a structure by a vehicle weight and a deflection amount caused on the structure can be grasped, but it is difficult to grasp the relation between the magnitude of the force applied to the structure by the vehicle weight and the flexural rigidity of the structure.

SUMMARY

An object of the present invention is to provide a structure deflection measurement apparatus that solves the abovementioned problem; a problem that it is difficult to grasp the relation between the magnitude of a force applied to a structure and the flexural rigidity of the structure based on the measured deflection amount.

A structure deflection measurement apparatus according to an aspect of the present invention includes: a deflection acquiring unit configured to acquire a deflection amount caused in a measurement target region on a structure by a vehicle traveling on the structure; a vehicle position acquiring unit configured to acquire a position of the vehicle on the structure at time when the deflection amount is acquired; and a rigidity coefficient calculating unit configured to calculate a rigidity coefficient that specifies a relation between a magnitude of a force applied to the structure due to a weight of the vehicle and flexural rigidity of the structure from a relation equation, the acquired deflection amount, and the detected position of the vehicle. The relation equation is established among a position of the vehicle on the structure, the magnitude of the force, a position of the measurement target region on the structure, a length of the structure, the flexural rigidity, and a deflection amount caused in the measurement target region.

Further, a structure deflection measurement method according to another aspect of the present invention includes: acquiring a deflection amount caused in a measurement target region on a structure by a vehicle traveling on the structure; acquiring a position of the vehicle on the structure at time when the deflection amount is acquired; and calculating a rigidity coefficient that specifies a relation between a magnitude of a force applied to the structure due to a weight of the vehicle and flexural rigidity of the structure from a relation equation, the acquired deflection amount, and the detected position of the vehicle. The relation equation is established among a position of the vehicle on the structure, the magnitude of the force, a position of the measurement target region on the structure, a length of the structure, the flexural rigidity, and a deflection amount caused in the measurement target region.

Further, on a non-transitory computer-readable recording medium according to another aspect of the present invention, a program is recorded. The program includes instructions for causing a computer to execute: a process of acquiring a deflection amount caused in a measurement target region on a structure by a vehicle traveling on the structure; a process of acquiring a position of the vehicle on the structure at time when the deflection amount is acquired; and a process of calculating a rigidity coefficient that specifies a relation between a magnitude of a force applied to the structure due to a weight of the vehicle and flexural rigidity of the structure from a relation equation, the acquired deflection amount, and the detected position of the vehicle. The relation equation is established among a position of the vehicle on the structure, the magnitude of the force, a position of the measurement target region on the structure, a length of the structure, the flexural rigidity, and a deflection amount caused in the measurement target region.

According to the present invention with the configurations as described above, the relation between the magnitude of a force applied to a structure and the flexural rigidity of the structure can be grasped based on the measured deflection amount.

BRIEF DESCRIPTION OF DRAWINGS

FIG. 5 is a view showing an example of an equation for deriving a relation between the magnitude of a force and flexural rigidity from a deflection amount;

EXAMPLE EMBODIMENTS

Next, example embodiments of the present invention will be described in detail with reference to the drawings.

First Example Embodiment

Figure 1:
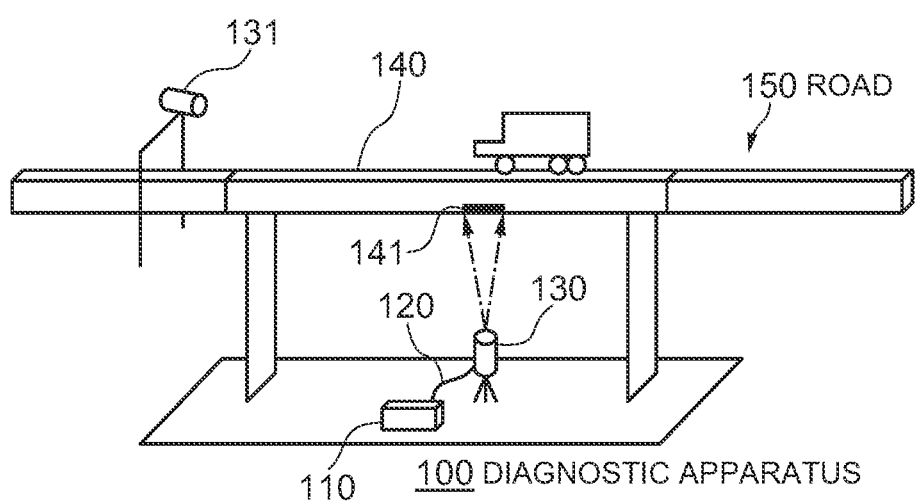
FIG. 1 is a view showing a configuration example of a structure deflection measurement apparatus according to a first example embodiment of the present invention.

FIG. 1 is a view showing a configuration example of a deflection measurement apparatus 100 according to a first example embodiment of the present invention. Referring to FIG. 1, the deflection measurement apparatus 100 includes a computer 110 and two cameras 130 and 131.

The camera 130 is an image capture device for deflection detection that captures a region 141 existing on the surface of a structure 140 to be diagnosed at a given frame rate. In this example embodiment, the structure 140 is a bridge on which a road 150 such as an expressway crosses over a river or the like. In this example embodiment, the region 141 is part of a floor deck that is a diagnosis spot of the bridge. However, the structure 140 is not limited to a bridge. The structure 140 may be an elevated structure of an expressway or a railway, or the like. The size of the region 141 is, for example, several tens of centimeters square. The camera 130 is attached to a pan head (not shown) on a tripod (not shown) so that the shooting direction of the camera can be fixed in any direction. The camera 130 may be, for example, a high-speed camera that includes a CCD (Charge-Coupled Device) image sensor or a CMOS (Complementary MOS) image sensor having pixel capacity of about several million pixels. Moreover, the camera 130 may be a black and white camera, or may be an infrared camera or a color camera. Moreover, the camera 130 may include a GPS receiver that measures the position of the camera, or may include an orientation sensor and an acceleration sensor that measure the shooting direction of the camera. The camera 130 is connected to the computer 110 through a cable 120. However, the camera 130 may be connected to the computer 110 by wireless communication.

The camera 131 is an image capture device for vehicle position detection that detects the position of a vehicle traveling on the structure 140. The camera 131 is installed above a region after passage of the structure 140 so as to be able to capture an image of a vehicle traveling on a road from the entrance to the exit of the structure 140. However, the installation position of the camera 131 is not limited to the above. The camera 131 may be installed above a region before passage of the structure 140, or may be installed at a location to face the structure 140 from the lateral direction. Moreover, the number of the cameras 131 is not limited to one, and a plurality of cameras 131 may be installed. The camera 131 may be a video camera including a CCD image sensor or a CMOS image sensor. Moreover, the camera 131 may be a black and white camera, or may be an infrared camera or a color camera. The camera 131 is connected to the computer 110 by wireless communication, and is configured to transmit the captured image to the computer 110 by wireless communication. However, the camera 131 may be connected to the computer 110 by wired communication.

The computer 110 is configured to acquire an image of the region 141 of the structure 140 captured by the camera 130 via the cable 120. Moreover, the computer 110 is configured to measure a deflection amount of the region 141 of the structure 140 based on the image acquired from the camera 130. Moreover, the computer 110 is configured to acquire an image of a vehicle traveling on the structure 140 captured by the camera 131 by wireless communication. Moreover, the computer 110 is configured to acquire the position of a vehicle traveling on the structure 140 based on an image acquired from the camera 131. Moreover, the computer 110 is configured to calculate a numerical value that specifies a relation between the magnitude of a force applied to the structure 140 by a vehicle weight and the flexural rigidity of the structure 140 based on the acquired deflection amount and vehicle position and a parameter previously set and stored. This numerical value will be referred to as a rigidity coefficient in this specification. Moreover, the computer 110 is configured to calculate the value of the flexural rigidity of the structure 140 based on the calculated rigidity coefficient and the weight of the vehicle. Moreover, the computer 110 is configured to calculate the weight of a vehicle having an unknown weight traveling on the structure 140 by using the calculated value of the flexural rigidity. Moreover, the computer 110 is configured to perform a deterioration diagnosis of the structure 140 by using the value of the flexural rigidity calculated above.

Figure 2:
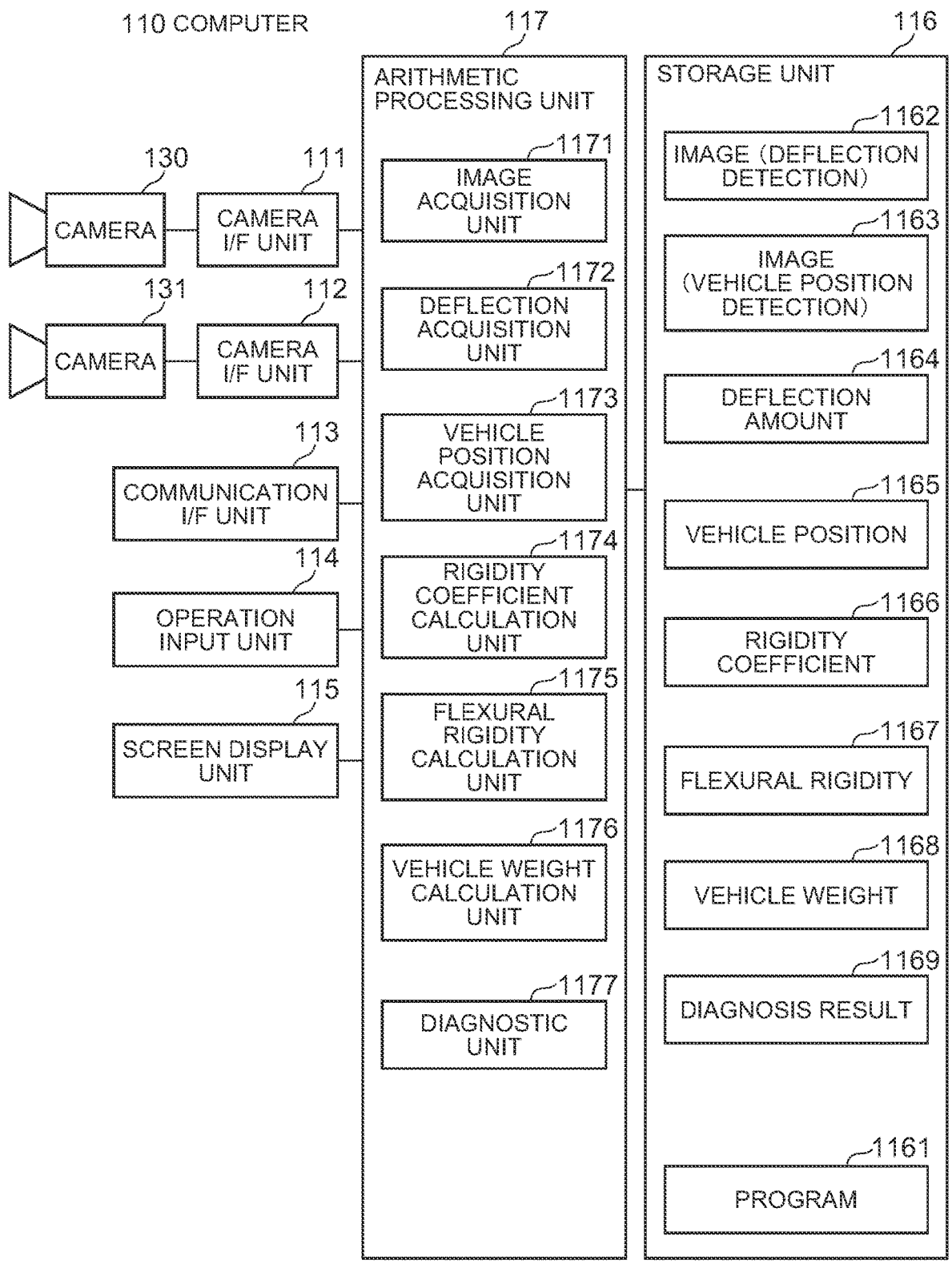
FIG. 2 is a block diagram showing an example of a configuration of a computer in the structure deflection measurement apparatus according to the first example embodiment of the present invention.

FIG. 2 is a block diagram showing an example of a configuration of the computer 110. Referring to FIG. 2, the computer 110 includes camera I/F (interface) units 111 and 112, a communication I/F unit 113, an operation input unit 114, a screen display unit 115, a storage unit 116, and an arithmetic processing unit 117.

The camera I/F unit 111 is connected to the camera 130 through the cable 120, and is configured to perform transmission and reception of data with the camera 130 and the arithmetic processing unit 117. The camera I/F unit 112 is connected to the camera 131 by wireless communication, and is configured to perform transmission and reception of data with the camera 131 and the arithmetic processing unit 117. The communication I/F unit 113 is composed of a data communication circuit, and is configured to perform data communication with an external device (not shown) by wired or wireless communication. The operation input unit 114 is composed of an operation input device such as a keyboard and a mouse, and is configured to detect an operator's operation and output to the arithmetic processing unit 117. The screen display unit 115 is composed of a screen display device such as an LCD (Liquid Crystal Display), and is configured to display various information such as a menu screen on a screen in response to an instruction from the arithmetic processing unit 117.

The storage unit 116 is composed of a storage device such as a hard disk and a memory, and is configured to store processing information and a program 1161 that are necessary for various processes in the arithmetic processing unit 117. The program 1161 is a program that is loaded to and executed by the arithmetic processing unit 117 to realize various processing units, and is previously loaded from an external device or a recording medium, which are not shown, via a data input/output function such as the communication I/F unit 113 and stored into the storage unit 116. Major processing information stored in the storage unit 116 are an image 1162, an image 1163, a deflection amount 1164, a vehicle position 1165, a rigidity coefficient 1166, flexural rigidity 1167, a vehicle weight 1168, and a diagnosis result 1169.

The image 1162 is a time-series image captured by the camera 130 for the purpose of deflection detection. The image 1162 may be a plurality of frame images composing a moving image of the region 141 of the structure 140 captured by the camera 130.

The image 1163 is a time-series image captured by the camera 131 for the purpose of detection of the position of a vehicle. The image 1163 may be a plurality of frame images composing a moving image of a vehicle traveling on the structure 140 captured by the camera 131. Each frame image is provided with a shooting time.

Figure 3:
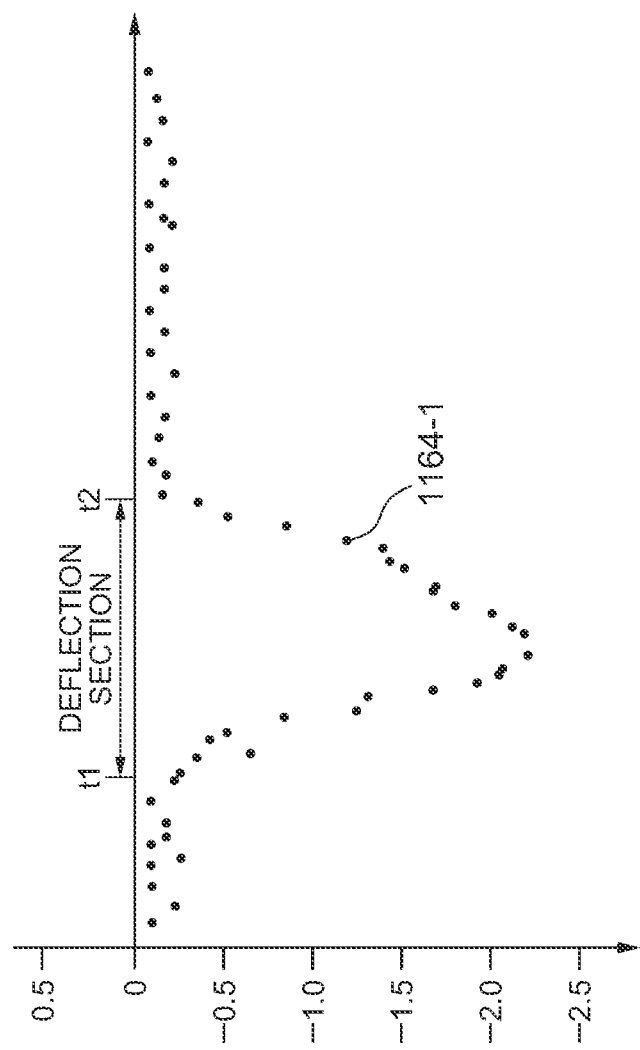
FIG. 3 is a view showing an example of the time series of deflection amounts measured by the structure deflection measurement apparatus according to the first example embodiment of the present invention.

The deflection amount 1164 is time-series data representing a deflection amount caused in the region 141 of the structure 140 due to the weight of a vehicle traveling on the structure 140. The deflection amount 1164 is generated based on the image 1162. The deflection amount 1164 includes the time of acquisition (the time of measurement) and the value of a deflection amount. FIG. 3 shows an example of the time series of the deflection amount 1164. The vertical axis of a graph shown in FIG. 3 takes a deflection amount, the horizontal axis takes time. Dots drawn in the graph each represent the value of a deflection amount at a certain time. The example of FIG. 3 shows a temporal change in deflection amount of the region 141 when one vehicle passes the structure 140. As illustrated in FIG. 3, in a situation where one vehicle passes the structure 140, the structure 140 starts to bend at time t1 when the vehicle enters the structure 140, the maximum deflection amount is reached at time when the vehicle travels directly on the region 141, the deflection amount then gradually decreases, and the deflection amount shows a tendency to return to zero again after time t2 when the vehicle exits the structure 140. A section from time t1 to time t2 when deflection is thus caused will be referred to as a deflection section. The deflection section can be detected as, for example, a section in which a deflection amount becomes equal to or more than a threshold value. Since even minute vibrations are picked up as deflection to be measured, a general technique such as passing through a low-pass filter may be added. That is to say, a polygonal line connecting the dots in chronological order may be regarded as a signal waveform and passed through a low-pass filter. Alternatively, it may be replaced with an approximate curve that minimizes the squared error of the distance from the deflection amount represented by the dots.

The vehicle position 1165 is data representing the position of a vehicle traveling on the structure 140. The vehicle position 1165 is generated based on the image 1163. The vehicle position 1165 includes the time of acquisition (the time of measurement) and position data.

The rigidity coefficient 1166 is a numerical value that specifies a relation between the magnitude of a force applied to the structure 140 due to the weight of a vehicle traveling on the structure 140 and the flexural rigidity of the structure 140. The rigidity coefficient 1166 is calculated based on the deflection amount 1164, the vehicle position 1165, and a previously set parameter. The rigidity coefficient 1166 includes a value and the date and time of calculation thereof. The rigidity coefficient 1166 may be linked with the deflection amount 1164, the vehicle position 1165 and so on used for calculation thereof.

The flexural rigidity 1167 is an estimation value of the flexural rigidity of the structure 140 calculated from the rigidity coefficient 1166 and the weight of a vehicle. The flexural rigidity 1167 includes the value of the flexural rigidity and the date and time of calculation thereof. The flexural rigidity 1167 may be linked with the rigidity coefficient 1166 used for calculation thereof.

The vehicle weight 1168 is data representing an estimated weight of a vehicle having an unknown weight calculated by using the flexural rigidity 1167.

The diagnosis result 1169 is data representing the result of a deterioration diagnosis of the structure 140 executed by using the flexural rigidity 1167. The diagnosis result 1169 includes, for example, an ID that specifies the structure 140 to be diagnosed and the region 141, the presence or absence of deterioration, the date and time of diagnosis, and so on.

The arithmetic processing unit 117 includes a processor such as an MPU and its peripheral circuit, and is configured to load the program 1161 from the storage unit 116 and execute to make the above hardware and the program 1161 cooperate and realize various processing units. Major processing units realized by the arithmetic processing unit 117 are an image acquisition unit 1171, a deflection acquisition unit 1172, a vehicle position acquisition unit 1173, a rigidity coefficient calculation unit 1174, a flexural rigidity calculation unit 1175, a vehicle weight calculation unit 1176, and a diagnostic unit 1177.

The image acquisition unit 1171 is configured to acquire a time-series image captured by the camera 130 through the camera I/F unit 111, and store the acquired time-series image as the image 1162 into the storage unit 116. Moreover, the image acquisition unit 1171 is configured to acquire a time-series image captured by the camera 131 through the camera I/F unit 112, and store the acquired time-series image as the image 1163 into the storage unit 116.

The deflection acquisition unit 1172 is configured to acquire a deflection amount caused in the region 141 of the structure 140 due to the weight of a vehicle traveling on the structure 140 along a time series based on the image 1162 stored in the storage unit 116, and store the time series of the acquired deflection amount as the deflection amount 1164 into the storage unit 116. For example, the deflection acquisition unit 1172 retrieves all of the image 1162 stored in the storage unit 116, and measures a temporal change in deflection amount on the surface of the structure 140 from each image. For example, in the case of capturing an image of the floor deck of a bridge with the camera 130 from below, a shooting distance H from the camera to the floor deck is shortened by a deflection amount δ caused on the floor deck of the bridge due to the weight of a vehicle. Thus, the captured image is magnified about the optical axis of the camera, and apparent displacement $\delta_i$ due to deflection occurs. When the shooting distance is H, the displacement is $\delta_i$, the deflection amount is $\delta$, a distance from the camera optical axis to a displacement calculation position is y, and the focal distance of the camera is f, a relation of $\delta_i = yf\{1/(H-\delta)-1H\}$ is established. Therefore, by detection of the displacement $\delta_i$ of each frame image by a digital image correlation method or the like, the deflection amount of the surface of the structure 140 for each frame image can be calculated from the above equation. The shooting distance H can be measured in advance, for example, with a laser range finder, the distance y can be obtained from the displacement calculation position and the camera optical axis, and f is known for each imaging device.

The vehicle position acquisition unit 1173 is configured to acquire the position of a vehicle traveling on the structure 140 based on the image 1163 stored in the storage unit 116, and store the acquired vehicle position as the vehicle position 1165 into the storage unit 116. For example, the vehicle position acquisition unit 1173 acquires the position of a vehicle from the image 1163 by a method as described below. First, as an advance preparation, the field of view of the camera 131 is fixed so that each pixel of an image captured by the camera 131 and a position on the structure 140 have a one-to-one correspondence. Moreover, a correspondence table in which, for each pixel corresponding to a road surface of the structure shown in the image captured by the camera 131, the position of the pixel and a position on the structure 140 corresponding to the pixel in the position is created in advance. Then, in actual measurement, the vehicle position acquisition unit 1173 specifies a pixel on the road surface in which, for example, the front wheels of a vehicle shown in the image 1163 are in contact, and acquires a position on the structure corresponding to the pixel from the correspondence table. Then, the vehicle position acquisition unit 1173 considers the acquired position as the position of the vehicle. Alternatively, the vehicle position acquisition unit 1173 may consider a position that the abovementioned acquired position shifts to the rear side of the vehicle by a predetermined correction value as the vehicle position. The correction value can be half the distance between the front wheels and the rear wheels of a standard vehicle. However, the present invention is not limited to the above method. Any method can be used as long as a position on the structure 140 of a vehicle traveling on the structure 140 can be detected from an image obtained by capturing the vehicle.

The rigidity coefficient calculation unit 1174 is configured to calculate the rigidity coefficient 1166 based on the deflection amount 1164 and the vehicle position 1165 that are stored in the storage unit 116 and a parameter previously set and stored, and store the rigidity coefficient 1166 into the storage unit 116. The rigidity coefficient calculation unit 1174 calculates the rigidity coefficient based on a principle as described below.

Figure 4:
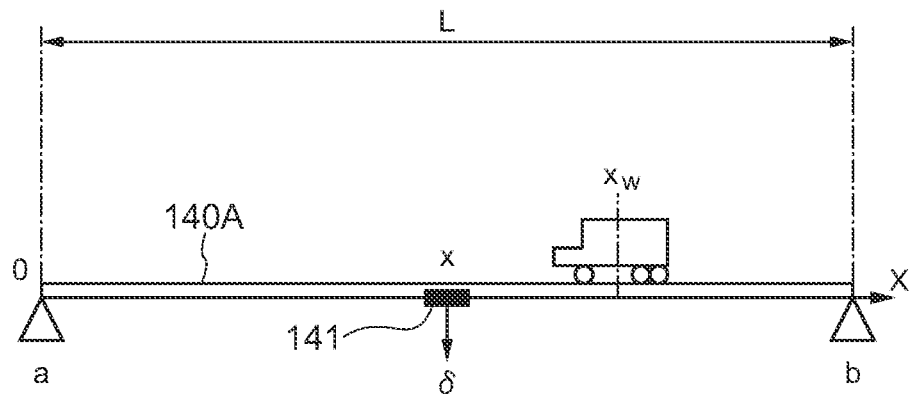
FIG. 4 is an explanatory view of a simple girder bridge model.

In a case where the structure 140 is a simple girder bridge or a multi-span simple bridge with a series of simple girders, the structure 140 can be modeled as a simple girder bridge 140A with both end points a and b fixed as shown in FIG. 4. Now, as a coordinate system, a coordinate system having the end point a as the origin and having an X axis parallel to the bridge axis direction is considered. It is assumed that the span length of the bridge 140A is L, the coordinate value of the center of the region 141 to measure deflection of the bridge 140A is x, the coordinate value of the center of a vehicle existing on the bridge 140A is $x_w$, the magnitude of a force applied to the bridge 140A by the vehicle is f, the Young's modulus of the bridge 140A is E, and the area moment of inertia is I. At this time, the deflection amount $\delta$ caused in the region 141 of the bridge 140A due to the weight of the vehicle is given by Equation 1 shown in FIG. 5. In Equation 1, K is a rigidity coefficient and is given by Equation 2 shown in FIG. 5. That is to say, the rigidity coefficient K is given by dividing the magnitude f of the applied force by the product of the Young's modulus E and the area moment of inertia I and the coefficient 6. Moreover, assuming that the weight of the vehicle is M and the gravitational acceleration is g, f is given by Equation 3 shown in FIG. 5.

The rigidity coefficient calculation unit 1174 is configured to calculate the rigidity coefficient K based on Equation 1 shown in FIG. 5 in a case where the structure 140 is a simple girder bridge and in a case where the structure 140 is a multi-span simple bridge with a series of simple girders.

The flexural rigidity calculation unit 1175 is configured to calculate the value of the flexural rigidity of the structure 140 based on the rigidity coefficient 1166 stored in the storage unit 116 and a vehicle weight input separately. To be specific, the flexural rigidity calculation unit 1175 calculates the value of f from the input vehicle weight and gravitational acceleration using Equation 3 of FIG. 5, and calculates the value of flexural rigidity EI by substituting the calculated value of f and the rigidity coefficient 1166 stored in the storage unit 116 into f and K of Equation 2 of FIG. 5.

The weight calculation unit 1176 is configured to calculate the weight of a vehicle having an unknown weight traveling on the structure 140 based on the flexural rigidity 1167 stored in the storage unit 116.

The diagnostic unit 1177 is configured to perform a deterioration diagnosis of the structure 140 based on the flexural rigidity 1167 stored in the storage unit 116.

Figure 6:
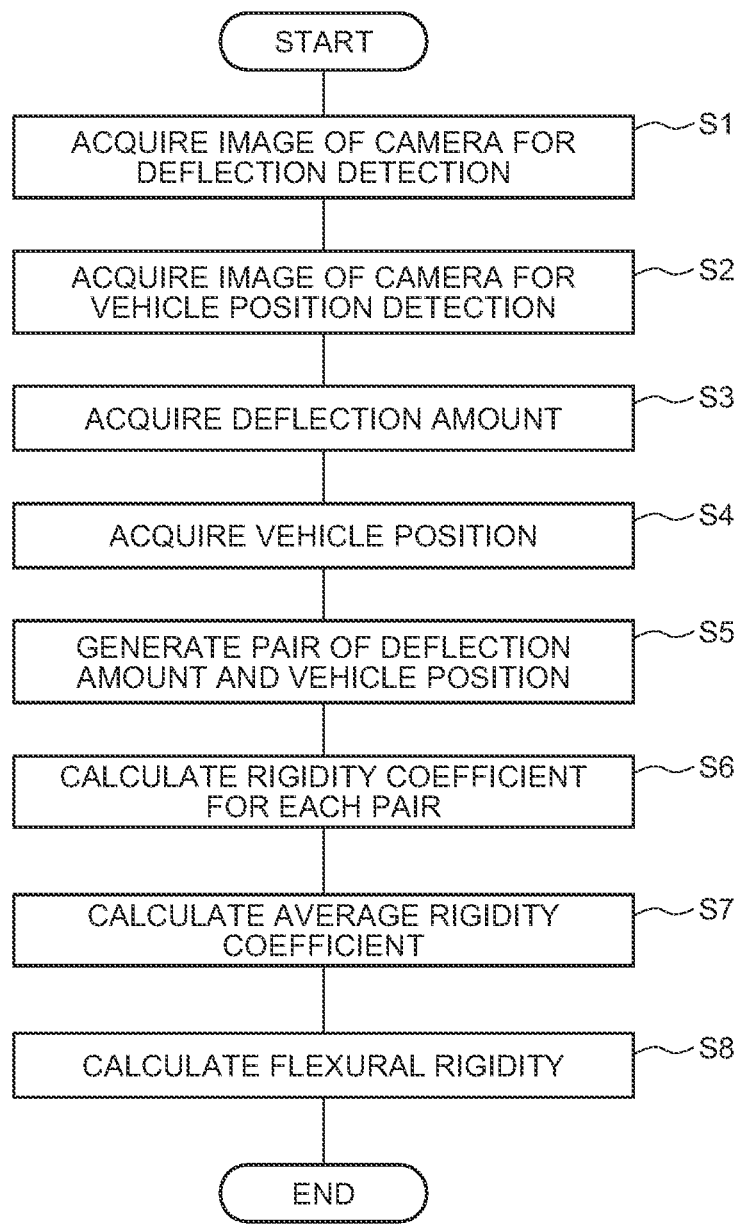
FIG. 6 is a flowchart showing an example of an operation when measuring flexural rigidity by running a vehicle of a specified weight in the structure deflection measurement apparatus according to the first example embodiment of the present invention.

Next, an operation of the deflection measurement apparatus 100 will be described. The operation of the deflection measurement apparatus 100 includes the following types;
(1) measurement of flexural rigidity by running a vehicle having a predetermined weight,
(2) measurement of the weight of a vehicle having an unknown weight, and
(3) deterioration diagnosis of a structure.
(1) Measurement of Flexural Rigidity by Running a Vehicle Having a Predetermined Weight First, an operation of measuring the flexural rigidity of the structure 140 by running a vehicle having a predetermined weight will be described. FIG. 6 is a flowchart showing an example of an operation of the deflection measurement apparatus 100 when measuring flexural rigidity by running a vehicle having a predetermined weight.

When installing measurement devices such as the computer 110 and the cameras 130 and 131 at the site and being ready to run only a vehicle having a predetermined weight on the structure 140, an operator inputs a flexural rigidity measurement instruction through the operation input unit 114. Then, the computer 110 starts a process shown in FIG. 6.

First, the image acquisition unit 1171 starts operating. The image acquisition unit 1171 acquires a time-series image of the region 141 of the structure 140 captured by the camera 130, and sequentially stores as the image 1162 into the storage unit 116 (step S1). Moreover, the image acquisition unit 1171 acquires a time-series image of a vehicle traveling on the structure 140 captured by the camera 131, and sequentially stores as the image 1163 into the storage unit 116 (step S2). The acquisition of the time-series images by the image acquisition unit 1171 is continued while only one vehicle having a predetermined weight passes the structure 140 at least once.

Next, the deflection acquisition unit 1172 retrieves the image 1162 from the storage unit 116, analyzes the retrieved time-series image 1162, acquires a deflection amount caused in the region 141 of the structure 140 by a vehicle having a predetermined weight traveling on the structure 140 along a time series, and stores the acquired deflection amount 1164 into the storage unit 116 (step S3). Next, the vehicle position acquisition unit 1173 retrieves the image 1163 from the storage unit 116, analyzes the retrieved time-series image 1163, and acquires the position of a vehicle having a predetermined weight traveling on the structure 140 (step S4).

Next, the rigidity coefficient calculation unit 1174 retrieves the deflection amount 1164 and the vehicle position 1165 from the storage unit 116, and pairs up a deflection amount and a vehicle position acquired at the same time within a deflection section (step S5). For example, in a case where a deflection amount indicated by reference numeral 1164-1 of FIG. 3 is acquired at time t3, the rigidity coefficient calculation unit 1174 pairs the deflection amount with the vehicle position 1165 at the closest time to time t3. The rigidity coefficient calculation unit 1174 generates a plurality of pairs as described above. However, generating a plurality of pairs is not essential, and only one pair may be generated. Here, the deflection amount forming the pair at a position closer to the center of the deflection section is preferable because it is larger than the deflection amount at a position closer to the end.

Next, the rigidity coefficient calculation unit 1174 calculates a rigidity coefficient for each pair of a deflection amount and a vehicle position (step S6). The rigidity coefficient calculation unit 1174 substitutes a deflection amount and a vehicle position forming a pair into $\delta$ and $x_w$ of Equation 1 of FIG. 5, substitutes values previously set as the position of the region 141 and the length into x and L, and thereby calculates the value of a rigidity coefficient K. Here, the rigidity coefficient calculation unit 1174 compares the vehicle position forming the pair with the position of the region 141 of the structure 140 to determine which of the upper and lower expressions of Equation 1 is used, and uses the upper expression if $0 \leq x \leq x_w$, whereas uses the lower expression if $x_w < x \leq L$. Next, the rigidity coefficient calculation unit 1174 calculates the average value of the rigidity coefficients obtained for each pair, and stores the average value as the rigidity coefficient 1166 into the storage unit 116 (step S7).

Next, the flexural rigidity calculation unit 1175 retrieves the rigidity coefficient 1166 from the storage unit 116, inputs a predetermined weight through the operation input unit 114, calculates the value of flexural rigidity EI based on Equations 2 and 3, and stores as the flexural rigidity 1167 into the storage unit 116 (step S8).

(2) Measurement of the Weight of a Vehicle Having an Unknown Weight

Figure 7:
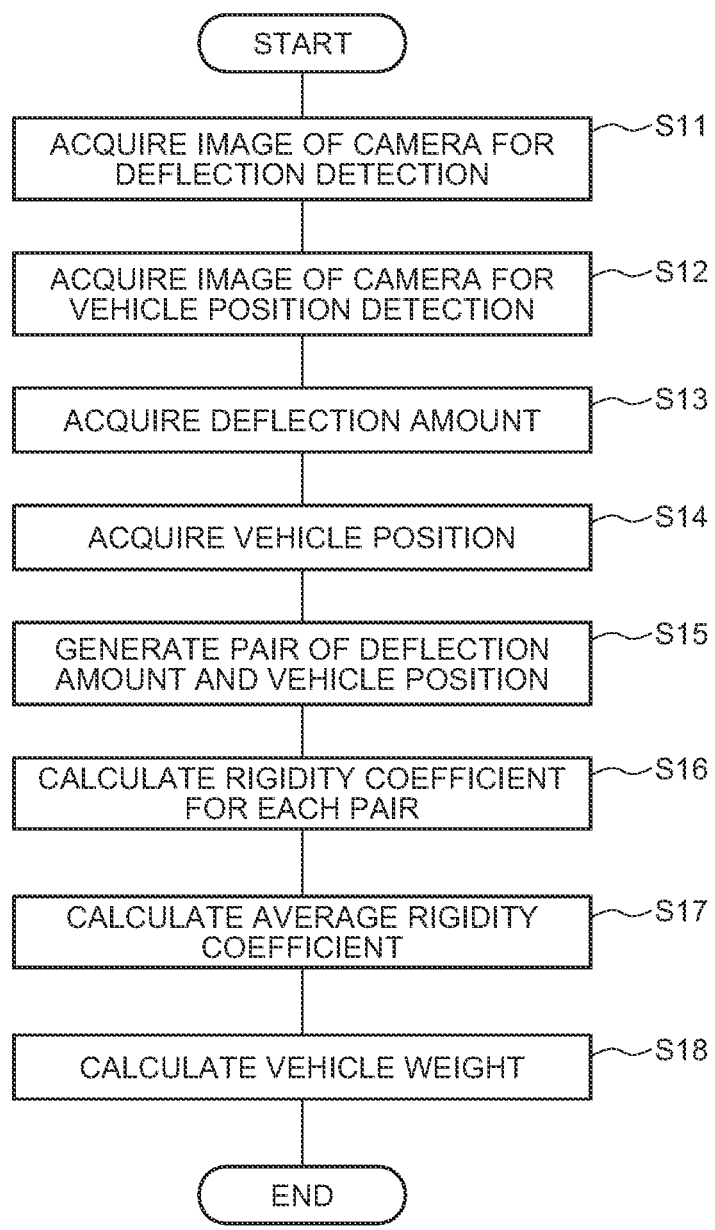
FIG. 7 is a flowchart showing an example of an operation when measuring the weight of a vehicle in the structure deflection measurement apparatus according to the first example embodiment of the present invention.

Next, an operation of measuring the weight of a vehicle having an unknown weight traveling on the structure 140 will be described. The measurement of the weight of a vehicle having an unknown weight is performed by using the latest flexural rigidity 1167 measured in (1). FIG. 7 is a flowchart showing an example of an operation of the deflection measurement apparatus 100 in measurement of the weight of a vehicle.

When inputting a vehicle weight measurement instruction through the operation input unit 114 after installing measurement devices such as the computer 110 and the cameras 130 and 131 at the site and being ready to measure the weight of a vehicle, the computer 110 starts a process shown in FIG. 7.

First, the image acquisition unit 1171 starts operating. The image acquisition unit 1171 acquires a time-series image of the region 141 of the structure 140 captured by the camera 130, and sequentially stores as the image 1162 into the storage unit 116 (step S11). Moreover, the image acquisition unit 1171 acquires a time-series image of a vehicle traveling on the structure 140 captured by the camera 131, and sequentially stores as the image 1163 into the storage unit 116 (step S12). The acquisition of the time-series images by the image acquisition unit 1171 is continued while only one vehicle having an unknown weight passes the structure 140.

Next, the deflection acquisition unit 1172 retrieves the image 1162 from the storage unit 116, analyzes the retrieved time-series image 1162, acquires a deflection amount caused in the region 141 of the structure 140 by a vehicle having an unknown weight traveling on the structure 140 along a time series, and stores the acquired deflection amount 1164 into the storage unit 116 (step S13). Next, the vehicle position acquisition unit 1173 retrieves the image 1163 from the storage unit 116, analyzes the retrieved time-series image 1163, and acquires the position of a vehicle having an unknown weight traveling on the structure 140 (step S14).

Next, the rigidity coefficient calculation unit 1174 retrieves the deflection amount 1164 and the vehicle position 1165 from the storage unit 116, and pairs up a deflection amount and a vehicle position acquired at the same time within a deflection section (step S15). However, generating a plurality of pairs is not essential, and only one pair may be generated. Next, by performing the same operation as in (1), the rigidity coefficient calculation unit 1174 calculates a rigidity coefficient for each pair of a deflection amount and a vehicle position (step S16), and thereafter, calculates the average value thereof and stores as the rigidity coefficient 1166 into the storage unit 116 (step S17).

Next, the weight calculation unit 1176 retrieves the rigidity coefficient 1166 and the flexural rigidity 1167 from the storage unit 116, calculates a vehicle weight M based on Equations 2 and 3 of FIG. 5, and stores as the vehicle weight 1168 into the storage unit 116 (step S18). The weight calculation unit 1176 may display the calculated weight M on the screen display unit 115, or/and transmit to an external terminal through the communication I/F unit 113.

(3) Deterioration Diagnosis of Structure

Figure 8:
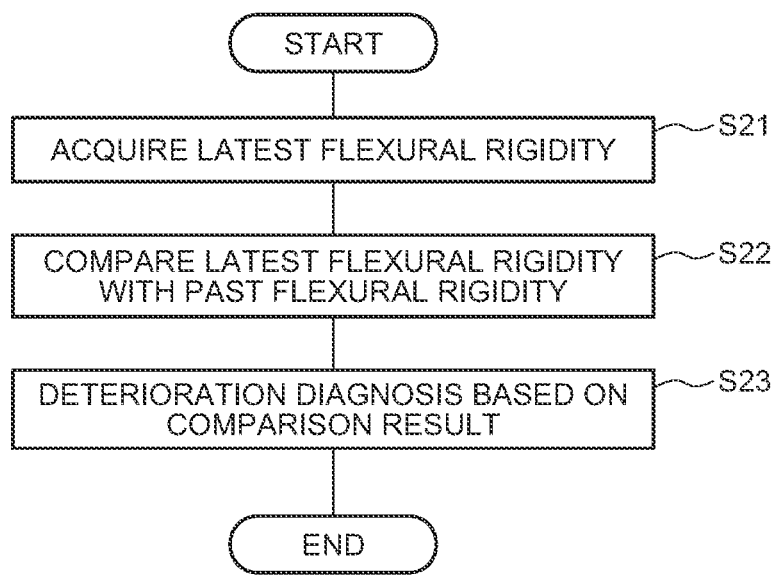
FIG. 8 is a flowchart showing an example of an operation when performing a deterioration diagnosis of a structure in the structure deflection measurement apparatus according to the first example embodiment of the present invention.

Next, an operation of performing a deterioration diagnosis of the structure 140 will be described. The deterioration diagnosis of the structure 140 is performed by comparing the past flexural rigidity 1167 measured and stored in (1) with the latest flexural rigidity measured in diagnosis. FIG. 8 is a flowchart showing an example of an operation of the deflection measurement apparatus 100 when performing a deterioration diagnosis of the structure 140.

When installing measurement devices such as the computer 110 and the cameras 130 and 131 at the site and being ready to run only a vehicle having a predetermined weight on the structure 140, an operators input a deterioration diagnosis instruction through the operation input unit 114. Then, the computer 110 starts a process shown in FIG. 8.

First, the computer 110 performs the same operation as in the measurement of flexural rigidity by running a vehicle having a predetermine weight of (1), and thereby acquires the latest flexural rigidity of the structure 140 and stores as new flexural rigidity 1167 into the storage unit 116 (step S21). Next, the diagnostic unit 1177 retrieves all of the flexural rigidity 1167 from the storage unit 116, and compares the latest flexural rigidity of them with the past flexural rigidity (step S22). The past flexural rigidity to be used may be flexural rigidity measured a certain period (for example, half a year) before the present. Alternatively, the past flexural rigidity to be used may be flexural rigidity before the date and time of the occurrence of a disaster such as an earthquake that occurred immediately before. Next, the diagnostic unit 1177 determines whether or not the structure 140 has deteriorated based on the above comparison result (step S23). For example, the diagnostic unit 1177 determines that the structure 140 has deteriorated when the latest flexural rigidity is lowered by a certain rate or a certain value or more with respect to the past flexural rigidity, and otherwise, determines that the structure 140 is sound.

As described above, according to this example embodiment, a relation between the magnitude of a force due to a vehicle weight applied to the structure 140 and the flexural rigidity of the structure 140 can be grasped based on the measured deflection amount. The reason is that the computer 110 calculates a rigidity coefficient that specifies a relation between the magnitude of a force applied to the structure 140 due to a vehicle weight and the flexural rigidity of the structure 140 based on the acquired deflection amount and vehicle position and a parameter previously set and stored.

Further, according to this example embodiment, the weight of a vehicle having an unknown weight traveling on the structure 140 can be calculated by using the value of the calculated flexural rigidity.

Further, according to this example embodiment, a deterioration diagnosis of the structure 140 can be performed by using the value of the calculated flexural rigidity.

In this example embodiment, various additions and changes are possible. For example, in this example embodiment, displacement of the structure 140 is detected based on an image captured by the camera 130 that captures the structure 140. However, a sensor that detects displacement of the structure 140 is not limited to a camera. For example, the deflection amount of the structure 140 may be detected by a laser range finder. Moreover, for example, the deflection amount of the structure 140 may be detected by a strain gauge.

Further, in this example embodiment, the position of a vehicle traveling on the structure 140 is detected based on an image captured by the camera 131. However, a sensor that detects the position of a vehicle traveling on the structure 140 is not limited to a camera. For example, a vehicle sensor (an acceleration sensor, an optical sensor, or the like) that detects the passage of a vehicle and a speed sensor that detects the speed of a passing vehicle may be installed at the entrance of the structure 140, and the time at which the vehicle passes each position on the structure 140 may be calculated based on the entrance passage time and the vehicle speed. Alternatively, a GPS mounted on a vehicle may be used to transmit information of the position of the vehicle and time from the vehicle to the computer 110 every moment.

Further, the flexural rigidity calculation unit 1175, the vehicle weight calculation unit 1176, and the diagnostic unit 1177 are included in this example embodiment, but all or some of them may be omitted.

Second Example Embodiment

Figure 9:
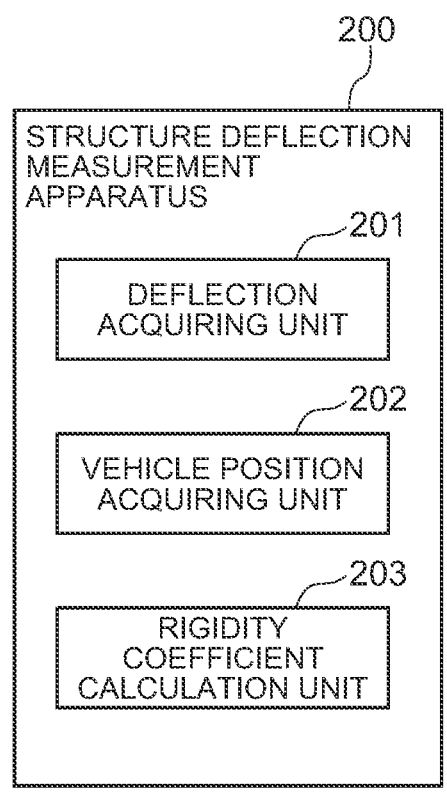
FIG. 9 is a view showing a configuration example of a structure deflection measurement apparatus according to a second example embodiment of the present invention.

Next, a second example embodiment of the present invention will be described with reference to FIG. 9. FIG. 9 is a block diagram of a structure deflection measurement apparatus 200 according to this example embodiment. In this example embodiment, the overview of a structure deflection measurement apparatus according to the present invention will be described.

Referring to FIG. 9, the structure deflection measurement apparatus 200 according to this example embodiment includes a deflection acquiring unit 201, a vehicle position acquiring unit 202, and a rigidity coefficient calculating unit 203.

The deflection acquiring unit 201 is configured to acquire a deflection amount caused at a predetermined position on a structure due to the weight of a vehicle traveling on the structure. The deflection acquiring unit 201 can be configured, for example, in the same manner as the deflection acquisition unit 1172 shown in FIG. 2, but is not limited thereto.

The vehicle position acquiring unit 202 is configured to detect a position on the structure of the vehicle at time when the deflection acquiring unit 201 acquires the deflection amount. The vehicle position acquiring unit 202 can be configured, for example, in the same manner as the vehicle position acquisition unit 1173 shown in FIG. 2, but is not limited thereto.

The rigidity coefficient calculating unit 203 is configured to substitute the acquired deflection amount, the vehicle position, the predetermined position, and a length of the structure into a relation equation established among a length of a structure, a magnitude of a force applied to the structure due to a weight of a vehicle, a position on the structure to which the weight of the vehicle is applied, a deflection amount acquired by the deflection acquiring unit 201, a position of the vehicle detected by the vehicle position acquiring unit 202, and flexural rigidity of the structure, and calculate a rigidity coefficient that specifies the relation between the magnitude of the force and the flexural rigidity. The rigidity coefficient calculating unit 203 can be configured, for example, in the same manner as the rigidity coefficient calculation unit 1174 shown in FIG. 2, but is not limited thereto.

The structure deflection measurement apparatus 200 thus configured operates in the following manner. The deflection acquiring unit 201 acquires a deflection amount caused in a predetermined position on a structure due to the weight of a vehicle traveling on the structure. Moreover, the vehicle position acquiring unit 202 detects a position on the structure of the vehicle at time when the deflection acquiring unit 201 acquires the deflection amount. Then, the rigidity coefficient calculating unit 203 substitutes the acquired deflection amount, the vehicle position, the predetermined position, and a length of the structure into a relation equation established among a length of a structure, a magnitude of a force applied to the structure due to a weight of a vehicle, a position on the structure to which the weight of the vehicle is applied, a deflection amount acquired by the deflection acquiring unit 201, a position of the vehicle detected by the vehicle position acquiring unit 202, and calculate a rigidity coefficient that specifies the relation between the magnitude of the force and the flexural rigidity.

With the configurations and operations as described above, this example embodiment makes it possible to grasp a relation between the magnitude of a force due to a vehicle weight applied to a structure and the flexural rigidity of the structure based on the measured deflection amount. The reason is that based on the acquired deflection amount and vehicle position and information such as the length of a structure set and stored in advance, a rigidity coefficient that specifies a relation between the magnitude of a force applied to a structure due to a vehicle weight and the flexural rigidity of the structure.

Although the present invention has been described above with reference to the example embodiments, the present invention is not limited to the above example embodiments. The configurations and details of the present invention can be changed in various manners that can be understood by one skilled in the art within the scope of the present invention.

The present invention can be utilized, for example, in the case of measuring a displacement amount such as a deflection amount on a structure such as a bridge caused by a vehicle passing the structure The whole or part of the example embodiments disclosed above can be described as, but not limited to, the following supplementary notes.

[Supplementary Note 1]

A structure deflection measurement apparatus comprising:
 a deflection acquiring unit configured to acquire a deflection amount caused in a measurement target region on a structure by a vehicle traveling on the structure;
 a vehicle position acquiring unit configured to acquire a position of the vehicle on the structure at time when the deflection amount is acquired; and
 a rigidity coefficient calculating unit configured to calculate a rigidity coefficient that specifies a relation between a magnitude of a force applied to the structure due to a weight of the vehicle and flexural rigidity of the structure from a relation equation, the acquired deflection amount, and the detected position of the vehicle, the relation equation being established among a position of the vehicle on the structure, the magnitude of the force, a position of the measurement target region on the structure, a length of the structure, the flexural rigidity, and a deflection amount caused in the measurement target region.

[Supplementary Note 2]

The structure deflection measurement apparatus according to Supplementary Note 1, wherein:
 the deflection acquiring unit is configured to acquire the deflection amount at a plurality of timings during a period when the vehicle travels on the structure; and
 the rigidity coefficient calculating unit is configured to generate a pair of the acquired deflection amount and the acquired position of the vehicle at each of the timings, calculate the rigidity coefficient for each of the pairs, and calculate an average value of the rigidity coefficient calculated for each of the pairs.

[Supplementary Note 3]

The structure deflection measurement apparatus according to Supplementary Note 1, further comprising a flexural rigidity calculating unit configured to calculate the flexural rigidity from the rigidity coefficient and the weight of the vehicle of a case where the vehicle is a vehicle whose weight is known.

[Supplementary Note 4]

The structure deflection measurement apparatus according to Supplementary Note 3, further comprising a weight calculating unit configured to calculate a weight of a vehicle whose weight is unknown from the rigidity coefficient and the flexural rigidity of a case where the vehicle is the vehicle whose weight is unknown.

[Supplementary Note 5]

The structure deflection measurement apparatus according to Supplementary Note 3, further comprising a diagnosing unit configured to perform a deterioration diagnosis of the structure based on a result of comparing the flexural rigidity with flexural rigidity previously calculated and stored by the flexural rigidity calculating unit.

[Supplementary Note 6]

A structure deflection measurement method comprising:
 acquiring a deflection amount caused in a measurement target region on a structure by a vehicle traveling on the structure;
 acquiring a position of the vehicle on the structure at time when the deflection amount is acquired; and
 calculating a rigidity coefficient that specifies a relation between a magnitude of a force applied to the structure due to a weight of the vehicle and flexural rigidity of the structure from a relation equation, the acquired deflection amount, and the detected position of the vehicle, the relation equation being established among a position of the vehicle on the structure, the magnitude of the force, a position of the measurement target region on the structure, a length of the structure, the flexural rigidity, and a deflection amount caused in the measurement target region.

[Supplementary Note 7]

The structure deflection measurement method according to Supplementary Note 6, wherein:
 in acquiring the deflection amount, the deflection amount is acquired at a plurality of timings during a period when the vehicle travels on the structure; and
 in calculating the rigidity coefficient, a pair of the acquired deflection amount and the acquired position of the vehicle is generated at each of the timings, the rigidity coefficient is calculated for each of the pairs, and an average value of the rigidity coefficient calculated for each of the pairs is calculated.

[Supplementary Note 8]

The structure deflection measurement method according to Supplementary Note 6, further comprising calculating the flexural rigidity from the rigidity coefficient and the weight of the vehicle of a case where the vehicle is a vehicle whose weight is known.

[Supplementary Note 9]

The structure deflection measurement method according to Supplementary Note 8, further comprising calculating a weight of a vehicle whose weight is unknown from the rigidity coefficient and the flexural rigidity of a case where the vehicle is the vehicle whose weight is unknown.

[Supplementary Note 10]

The structure deflection measurement method according to Supplementary Note 8, further comprising performing a deterioration diagnosis of the structure based on a result of comparing the flexural rigidity with flexural rigidity previously calculated and stored by the flexural rigidity calculating unit.

[Supplementary Note 11]

A non-transitory computer-readable recording medium on which a program is recorded, the program comprising instructions for causing a computer to execute:
 a process of acquiring a deflection amount caused in a measurement target region on a structure by a vehicle traveling on the structure;
 a process of acquiring a position of the vehicle on the structure at time when the deflection amount is acquired; and
 a process of calculating a rigidity coefficient that specifies a relation between a magnitude of a force applied to the structure due to a weight of the vehicle and flexural rigidity of the structure from a relation equation, the acquired deflection amount, and the detected position of the vehicle, the relation equation being established among a position of the vehicle on the structure, the magnitude of the force, a position of the measurement target region on the structure, a length of the structure, the flexural rigidity, and a deflection amount caused in the measurement target region.

DESCRIPTION OF NUMERALS 100 deflection measurement apparatus
110 computer
111 camera I/F unit
112 camera I/F unit
113 communication I/F unit
114 operation input unit
115 screen display unit
116 storage unit
117 arithmetic processing unit
120 cable
130 camera
131 camera
140 structure
141 region
150 road
200 structure deflection measurement apparatus
201 acquiring unit
202 detecting unit
203 calculating unit

What is claimed is:

1. A structure deflection measurement apparatus comprising:
a memory containing program instructions; and
a processor coupled to the memory, wherein the processor is configured to execute the program instructions to:
acquire a deflection amount caused in a measurement target region on a structure by a vehicle traveling on the structure, at a plurality of timings during a period when the vehicle travels on the structure;
acquire a position of the vehicle on the structure at each of the timings;
generate a pair of the deflection amount and a position of the vehicle at each of the timings;
for the pair at each of the timings, calculate a rigidity coefficient that specifies a relation between a magnitude of a force applied to the structure due to a weight of the vehicle and a flexural rigidity of the structure, from a relation equation and the deflection amount and the position of the vehicle of the pair; and
calculate an average value of the rigidity coefficient calculated for the pair at each of the timings, wherein
the relation equation is established among the position of the vehicle on the structure, the magnitude of the force applied to the structure due to the weight of the vehicle, a position of the measurement target region on the structure, a length of the structure, the flexural rigidity of the structure, and the deflection amount caused in the measurement target region, and
wherein the relation equation is:

$$\delta = \begin{cases} K\dfrac{L-x_w}{L}x(-x^2 - x_w^2 + 2Lx_w) & (0 \le x \le x_w) \\ K\dfrac{L-x}{L}x_w(-x_w^2 - x^2 + 2Lx) & (x_w \le x \le L) \end{cases}$$

where $\delta$ represents the deflection amount, K represents the rigidity coefficient, L represents the length of the structure, x represents the position of the measurement target region, and $x_w$ represents the position of the vehicle.

2. The structure deflection measurement apparatus according to claim 1, wherein the processor is further configured to calculate the flexural rigidity from the rigidity coefficient and the weight of the vehicle in a case in which the weight of the vehicle is known.

3. The structure deflection measurement apparatus according to claim 2, wherein the processor is further configured to calculate the weight of the vehicle the rigidity coefficient and the flexural rigidity in a case in which the weight of the vehicle is unknown.

4. The structure deflection measurement apparatus according to claim 2, wherein the processor is further configured to perform a deterioration diagnosis of the structure based on a result of comparing the flexural rigidity with the flexural rigidity as previously calculated and stored.

5. The structure deflection measurement apparatus according to claim 1, wherein the structure is a bridge.

6. The structure deflection measurement apparatus according to claim 5, wherein in acquiring the deflection amount, a frame image is acquired from a high-speed camera that captures an image of a floor deck of the bridge from below, and the deflection amount is calculated from the acquired frame image.

7. The structure deflection measurement apparatus according to claim 6, wherein in acquiring the position of the vehicle, a camera image is acquired from a video camera capable of capturing an image of the vehicle traveling on a road from an entrance to an exit of the bridge, and the position of the vehicle is acquired from a position of a pixel of the vehicle shown in the acquired camera image and a table of correspondence between the position of the pixel and a position of the bridge created and recorded in advance.

8. A structure deflection measurement method performed by a computer and comprising:
acquiring a deflection amount caused in a measurement target region on a structure by a vehicle traveling on the structure, at a plurality of timings during a period when the vehicle travels on the structure;
acquiring a position of the vehicle on the structure at each of the timings;
generating a pair of the deflection amount and a position of the vehicle at each of the timings;
for the pair at each of the timings, calculating a rigidity coefficient that specifies a relation between a magnitude of a force applied to the structure due to a weight of the vehicle and a flexural rigidity of the structure, from a relation equation and the deflection amount and the position of the vehicle of the pair; and
calculating an average value of the rigidity coefficient calculated for the pair at each of the timings, wherein
the relation equation is established among the position of the vehicle on the structure, the magnitude of the force applied to the structure due to the weight of the vehicle, a position of the measurement target region on the structure, a length of the structure, the flexural rigidity of the structure, and the deflection amount caused in the measurement target region, and
wherein the relation equation is:

$$\delta = \begin{cases} K\dfrac{L-x_w}{L}x(-x^2 - x_w^2 + 2Lx_w) & (0 \le x \le x_w) \\ K\dfrac{L-x}{L}x_w(-x_w^2 - x^2 + 2Lx) & (x_w \le x \le L) \end{cases}$$

where δ represents the deflection amount, K represents the rigidity coefficient, L represents the length of the structure, x represents the position of the measurement target region, and $x_w$ represents the position of the vehicle.

9. A non-transitory computer-readable recording medium storing a program comprising instructions for causing a computer to execute:

a process of acquiring a deflection amount caused in a measurement target region on a structure by a vehicle traveling on the structure, at a plurality of timings during a period when the vehicle travels on the structure;

a process of acquiring a position of the vehicle on the structure at each of the timings;

a process of generating a pair of the deflection amount and a position of the vehicle at each of the timings;

a process of, for the pair at each of the timings, calculating a rigidity coefficient that specifies a relation between a magnitude of a force applied to the structure due to a weight of the vehicle and a flexural rigidity of the structure, from a relation equation and the deflection amount and the position of the vehicle of the pair; and a process of calculating an average value of the rigidity coefficient calculated for the pair at each of the timings, wherein the relation equation is established among the position of the vehicle on the structure, the magnitude of the force applied to the structure due to the weight of the vehicle, a position of the measurement target region on the structure, a length of the structure, the flexural rigidity of the structure, and the deflection amount caused in the measurement target region, and wherein the relation equation is:

$$\delta = \begin{cases} K\dfrac{L-x_w}{L}x(-x^2-x_w^2+2Lx_w) & (0 \le x \le x_w) \\ K\dfrac{L-x}{L}x_w(-x_w^2-x^2+2Lx) & (x_w \le x \le L) \end{cases}$$

where δ represents the deflection amount, K represents the rigidity coefficient, L represents the length of the structure, x represents the position of the measurement target region, and $x_w$ represents the position of the vehicle.

* * * * *